Patented Nov. 6, 1945

2,388,660

UNITED STATES PATENT OFFICE 2,388,660

PROPIOLYL HALIDES AND A METHOD OF MAKING THEM

Frederic C. Schaefer, Greenwich, Conn., assignor to Wingfoot Corporation, Akron, Ohio, a corporation of Delaware No Drawing. Application January 29, 1944, Serial No. 520,323

4 Claims. (Cl. 260—544)

This invention relates to the preparation of propiolyl halides, such as the chloride, bromide, and iodide. It includes the new products and their preparation by pyrolysis of the corresponding dihalo propionyl halide. It also includes the polymers of the propiolyl halides. This application is a continuation-in-part for my application Serial No. 439,951.

According to this invention, the dihalo propionyl halide is pyrolyzed to produce the new propiolyl halide. The following examples which relate particularly to the preparation of the chloro derivative are illustrative:

Example 1

Ninety-eight grams of alpha, beta dichloro propionyl chloride were pyrolyzed by being passed downward through a Pyrex tube (23 mm. internal diameter) packed with ¼ inch Berl saddles for a length of 22 inches. The section of tube containing the saddles was heated with a 20-inch electric furnace to 450° C. The exit gases were condensed and the liquid product fractionally distilled. The entire pyrolytic system was evacuated to 200 mm. pressure throughout the pyrolysis. The dichloro propionyl chloride was introduced at a rate of 1.5 grams per minute. Fractionation of the product gave as the propiolyl chloride a material boiling at 59–61° C. at 400 mm. ($N_D^{28}$ 1.4348)

The process is not limited to pyrolysis at such a high temperature or in an electric furnace. It is not necessary to carry out the reaction under reduced pressure. This is evident from the following examples:

Example 2

Eighty-seven grams of alpha, beta dichloro propionyl chloride were heated in a flask under a 10-inch packed column. The contents were heated to a temperature of 170–210° C. for a period of 1 to 2 hours. After pyrolysis was completed, the low boiling material which distilled below 95° C. was collected and fractionally redistilled. A fraction boiling at 72–75° C. was collected. ($N_D^{28}$ 1.4317)

Example 3

The propiolyl chloride obtained in Example 1 was sealed up and allowed to stand. After a period of time it had polymerized to a white crumbly solid which was infusible and somewhat resilient.

What I claim is:

1. The method of producing a propiolyl halide of the class consisting of the chlorides, bromides, and iodides which comprises pyrolyzing an alpha, beta dihalo propionyl halide at a temperature of at least 170° C.

2. The method of producing propiolyl chloride which comprises pyrolyzing alpha, beta dichloro propionyl chloride at a temperature of at least 170° C.

3. The class of propiolyl halides consisting of the chloride, bromide, and iodide.

4. Propiolyl chloride.

FREDERIC C. SCHAEFER.